Figure 1:
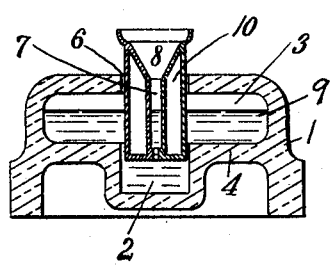

No. 818,403. PATENTED APR. 24, 1906.
F. M. ASHLEY.
INK WELL.
APPLICATION FILED MAR. 12, 1903.

WITNESSES:
Julian S. Wooster
George N. Kerr.

INVENTOR
Frank M. Ashley
BY
C. W. Edwards
ATTORNEY

UNITED STATES PATENT OFFICE.

FRANK M. ASHLEY, OF NEW YORK, N. Y.

INK-WELL.

No. 818,403.     Specification of Letters Patent.     Patented April 24, 1906.

Application filed March 12, 1903. Serial No. 147,370.

*To all whom it may concern:*

Be it known that I, FRANK M. ASHLEY, a citizen of the United States, residing at New York city, in the county of New York and State of New York, have invented certain new and useful Improvements in Ink-Wells, of which the following is a full, clear, and exact specification.

My invention relates to ink-wells, and has for its object the construction of a well of extreme simplicity, and therefore requiring but few parts, and one which may be easily filled, operated, and cleaned.

A further object is to provide a well of the dip-funnel type which shall be of large capacity and capable of raising the ink to the dip-cup with the same facility when the ink is nearly exhausted as when the well is entirely filled.

Still further, I propose to provide a well which cannot be filled so full that a depression of the dip-funnel will cause the ink to overflow from the well and one which, therefore, does not require the overflow-chamber heretofore customarily provided.

As far as I am aware, it has heretofore been deemed necessary in ink-wells of the type to which my invention generally appertains to make the plunger or float of such close fit within the auxiliary reservoir that shortly after the beginning of the plunger or float descent communication between the main and auxiliary reservoirs would become and continue absolutely interrupted, resulting in trapping a considerable body of ink beneath the plunger or float and in the event of a too rapid depression of the latter cause more than a necessary amount of ink to be forced up, and thereby occasion objectionable spurting and overflow of the ink from the dip-funnel. A further objection to the prior arrangement adverted to is due to the fact that communication between the main and auxiliary reservoirs is not reëstablished until the plunger or float is practically at the limit of its upward movement within said auxiliary reservoir. Consequently when the communication referred to occurs the ink in flowing from the main to the auxiliary reservoir is accompanied by a "gulping" or bubbling effect, which is highly objectionable. By my improvements I avoid the difficulties and objections noted and attain highly important results, as hereinafter fully appears.

Primarily my invention comprehends an ink-well the body of which contains a main and an auxiliary reservoir intercommunicating for the flow of ink in opposite directions from one to the other and an ink-raising plunger or float adapted to have its lower end move up and down within and substantially throughout the entire height of said auxiliary reservoir without interruption in the ink communication between the main reservoir and the lower portion of the auxiliary reservoir. A development of the invention consists in conditioning said plunger or float whereby it will be adapted to be so supported by its own buoyancy that its lower end will be normally within and can further descend in the auxiliary reservoir to operate in the manner above set forth. The functions and advantages of the ink-well construction thus generally referred to are clearly disclosed in the subsequent detailed description.

I will describe the invention more particularly with reference to the forms thereof shown in the accompanying drawings, in which—

Figure 3:
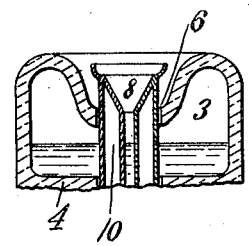
Figure 2:
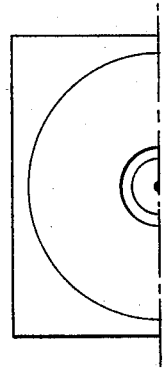
Figure 4:
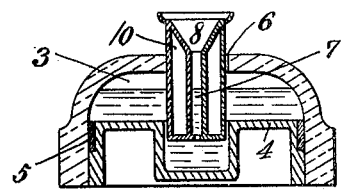

Figure 1 is a sectional view of a well constructed in accordance with my invention. Fig. 2 is a plan view of half of the top of Fig. 1, and Figs. 3 and 4 illustrate modifications of the well.

Referring more particularly to the drawings, 1 represents the body of the well, containing the main and auxiliary reservoirs 2 and 3, respectively. The body may comprise a single piece of glass or other material formed into proper shape or may comprise two or more parts, as illustrated in Fig. 4, for example. When constructed as shown in Fig. 4, the body will be provided with a bottom 4, fitting into the same and held in close engagement therewith by a washer 5. The matter of constructing the body of one or more parts is not, however, a material feature of my invention. An opening 6 is formed in the top or cover of the body, and immediately under this opening the reservoir 2 is formed, the latter being of substantially the same shape in cross-section as the shape of the opening 6.

The depth of the reservoir 2 is substantially the same as the distance from the upper end of the reservoir 2 to the top or cover in which the opening 6 is formed in order that no matter how full the well is filled with the ink 9 the depth of the latter from its surface to the upper end of the reservoir 2 will not exceed the depth of the ink in the reservoir 2. The depressible float 10 is of any suitable size or shape to nearly fill the opening 6 and the reservoir 2. The relative proportions and shapes of float 10 and opening 6 and reservoir 2 should be such that the float is capable of free vertical movement, being guided by the opening and the sides of the reservoir. At the same time care should be taken that the space between the float and the sides of the opening should be sufficient to permit free ingress of air from the outside atmosphere to the surface of the ink, and the space between the float and the sides of the reservoir 2 should be sufficient to at all times permit free and open communication by the ink between the reservoir 3 and reservoir 2. The float preferably comprises a closed body of any suitable construction or type having the central passage 7 and the dip-cup 8. Its weight should be so proportioned that when the well is filled to its fullest capacity the float will sink substantially low enough to bring its lower end partly into the reservoir 2. The float will then be relatively higher than the position shown in the drawings, and as the ink is exhausted the float will gradually sink lower and lower.

In operation the well is filled by withdrawing the float and pouring the ink through the opening 6 to the desired height or by raising the float until its lower end clears the sides of the reservoir 2 and pouring the ink in through the float. The float is then released, and its own buoyancy causes it to be supported in its proper position. When the pen is placed in the dip-cup and the float is depressed, the ink in the reservoir 2 will be forced up through the passage 7 into the dip-cup. Obviously the ink may be forced up into the dip-cup almost as long as any ink remains in reservoir 2.

By reason of the open communication between the two reservoirs the ink is gradually and continuously let into the auxiliary reservoir 2, thus doing away with the objectionable gulping or bubbling heretofore common in wells of this general class, and, furthermore, by reason of the fact that any abnormal or sudden pressure upon the float has a tendency to force the ink back from the auxiliary reservoir to the main reservoir instead of positively trapping it such pressure will not cause the well to spout; but, on the contrary, the ink will rise evenly and naturally to the dip-cup.

The capacity of the well may of course be increased or diminished without altering the proportions of the float or depth of the reservoirs by making the body and reservoir 3 wider or narrower, as the case may be.

In Fig. 3 the body is formed with the sides of its top or cover extending above the top of the float in order that if a book or other object be dropped upon the well it cannot strike the float and cause the ink to rise. It will be observed that when ink is poured into this well it cannot rise beyond the lower edge of the opening 6, because the air would then become trapped in the upper cistern and prevent further rise of the ink.

It will be readily appreciated that the float in its descending movements performs within the auxiliary reservoir the functions of a plunger acting upon ink in and upwardly forcing the same from said reservoir.

Having thus described my invention, I declare that what I claim as new, and desire to secure by Letters Patent, is—

1. In an ink-well, the combination of a body containing a main and an auxiliary reservoir intercommunicating for the flow of ink in opposite directions from one to the other, and a plunger of sufficiently less diameter than the auxiliary reservoir to have its lower end move up and down within and substantially throughout the height of said auxiliary reservoir without interruption in the ink communication between the main reservoir and the lower portion of the auxiliary reservoir, the downward pressure exerted by the lower end of the plunger, on ink within the auxiliary reservoir serving to upwardly force said ink, said main reservoir having a passage for air leading to the atmosphere during the movement of the plunger.

2. In an ink-well, the combination of a body containing a main and an auxiliary reservoir intercommunicating for the flow of ink in opposite directions from one to the other, and a plunger of sufficiently less diameter than that of said auxiliary reservoir to have its lower end move up and down within and substantially throughout the height of said auxiliary reservoir without interruption in the ink communication between the main reservoir and the lower portion of the auxiliary reservoir, the downward pressure exerted by the lower end of the plunger on the ink within the auxiliary reservoir serving to upwardly force said ink, said main reservoir having a passage for air leading to the atmosphere during the movement of the plunger.

3. In an ink-well, the combination of a body containing a main and an auxiliary reservoir intercommunicating for the flow of ink in opposite directions from one to the other, and a plunger of sufficiently less diameter than that of said auxiliary reservoir to have its lower end move up and down within said auxiliary reservoir to any degree without interruption in the ink communication between the main reservoir and the auxiliary reservoir, the downward pressure exerted by the lower end of the plunger on the ink within the auxiliary reservoir serving to upwardly force said ink; the sides of the well-body extending above the highest plane attained by the top of the plunger when the latter is in position and said main reservoir having a passage for air leading to the atmosphere during the movement of the plunger.

4. In an ink-well, the combination of a body containing a main and an auxiliary reservoir intercommunicating for the flow of ink in opposite directions from one to the other, and an ink-raising float of sufficiently less diameter than that of the auxiliary reservoir to have its lower end move up and down within and substantially throughout the height of said auxiliary reservoir without interruption in the ink communication between the main reservoir and the lower portion of the auxiliary reservoir, said main reservoir being open to the atmosphere during the movement of the float.

5. In an ink-well, the combination of a body containing a main and an auxiliary reservoir communicating with each other, and an ink-raising float of less diameter than that of the auxiliary reservoir adapted to be so supported by its own buoyancy that its lower end will be normally within said auxiliary reservoir and be permitted under a depressing action exerted on the float, to further descend within said reservoir without interrupting at any time the communication between said main and auxiliary reservoirs, said main reservoir being open to the atmosphere during the movement of the float.

6. In an ink-well, the combination of a body containing a main and an auxiliary reservoir of substantially the same depth and communicating with each other, and an ink-raising float of sufficiently less diameter than that of said auxiliary reservoir and adapted to be so supported by its own buoyancy that its lower end will be normally within said auxiliary reservoir and be permitted under a depressing action exerted on the float, to further descend within said reservoir without interrupting at any time, the communication between said main and auxiliary reservoirs.

7. In an ink-well, the combination of a body containing a main and an auxiliary reservoir intercommunicating for the flow of ink in opposite directions from one to the other, the auxiliary reservoir being a prolongation of the main reservoir, a cover for said body, having an opening, and a depressible ink-raising float adapted to have its lower end move up and down within and substantially throughout the height of said auxiliary reservoir, said float being of less diameter than said auxiliary reservoir whereby an intervening ink-circulation space will be formed to maintain constant communication between said reservoirs irrespective of any movement of the float within the auxiliary reservoir, said main reservoir being open to the atmosphere during the movement of the float.

8. In an ink-well, the combination of a body containing a main and an auxiliary reservoir, the latter being a prolongation of the former, a cover for said body, having an opening, and a depressible ink-raising float adapted to be so supported by its own buoyancy that its lower end will be normally within said auxiliary reservoir, said float being of less diameter than said auxiliary reservoir, whereby an intervening ink-circulation space will be formed to maintain constant communication between said reservoirs, irrespective of any movement of the float within the auxiliary reservoir, said main reservoir having a passage to the atmosphere during the movement of the float.

9. In an ink-well, the combination of a body containing a main and an auxiliary reservoir in open communication with each other, a cover for said body having an opening in a horizontal plane of the same diameter as the auxiliary reservoir, and a depressible ink-raising float having parallel sides and adapted to be so supported by its own buoyancy that its lower end will be normally within said auxiliary reservoir, said float adapted to extend through the top opening and main reservoir, and having that portion movable within the auxiliary reservoir, of less diameter than the latter whereby a constant communication is maintained between both reservoirs, irrespective of any movement of the float.

10. In an ink-well, the combination of a body containing a main and an auxiliary reservoir, and an ink-raising float adapted to have an upper part extend external to the body and the lower end of said float move up and down within and substantially throughout the height of said auxiliary reservoir without interruption in the ink communication between the main reservoir and the lower portion of the auxiliary reservoir by reason of the float being of considerably less diameter than that of said auxiliary reservoir, the sides of the well-body extending above the highest plane attained by the top of the float when the latter is in position.

11. In an ink-well, the combination of a body containing a main and an auxiliary reservoir in open communication with each other, and an ink-raising float of sufficiently less diameter than said auxiliary reservoir and adapted to be so supported by its own buoyancy that its lower end will be normally within said auxiliary reservoir and be permitted under a depressing action exerted on the float to further descend within said reservoir without interrupting at any time the communication between said main and auxiliary reservoirs, the sides of said well-body extending above the highest plane attained by the top of the float when the latter is in position.

12. An ink-well presenting in two parts, a body and an ink-raising float, said body containing a main and an auxiliary reservoir intercommunicating for the flow of ink in opposite directions from one to the other, said float being of sufficiently less diameter than said auxiliary reservoir to have its lower end move up and down within and substantially throughout the height of said auxiliary reservoir without interruption in the ink communication between the main reservoir and the lower portion of the auxiliary reservoir.

13. A two-part ink-well comprising a body having a main and auxiliary reservoir, at all times in open communication with each other, and a cover with an opening immediately above the auxiliary reservoir, said auxiliary reservoir and said opening being of substantially the same diameter, and a depressible float adapted to be buoyed by the ink and having parallel sides, said float being of nearly the same diameter as said opening and said auxiliary reservoir and extending through said opening and said main reservoir down into the auxiliary reservoir; substantially as described.

14. In an inkstand of the character described, a main reservoir, an auxiliary reservoir formed in the base thereof, a plunger having an ink-passage therethrough, the outer surface of said plunger being exposed to the main reservoir and the lower end of said plunger extending within said auxiliary reservoir, said auxiliary reservoir having a passage freely communicating at all times with said main reservoir, said main reservoir having a passage communicating with the atmosphere during the movement of said plunger.

15. In an ink-well, the combination of a body containing a main and an auxiliary reservoir, a plunger adapted to have its lower end move up and down within said auxiliary reservoir and of sufficiently-reduced diameter compared to that of the auxiliary to form a passage between the outer wall of said plunger and the inner wall of said auxiliary reservoir, said passage being open at all times, said main reservoir having a passage open to the atmosphere during the movement of the plunger, and means for conducting the ink to the upper end of the plunger.

16. An ink-well having a main reservoir provided with a passage normally open to the atmosphere, an auxiliary reservoir formed in the bottom of the ink-well, a float adapted to play vertically in said auxiliary reservoir and having its lower end of considerably-reduced diameter relative to that of the auxiliary reservoir so that a passage is formed between the outer wall of said float and the inner wall of said reservoir which passage is open at all times, and means for conducting ink to the upper end of said float.

17. In an inkstand of the character described, a main reservoir, an auxiliary reservoir formed in the bottom thereof, a plunger of sufficient diameter to raise the ink to the top thereof when depressed, the outer surface of which is exposed to the main reservoir and the lower end of which extends within said auxiliary reservoir, said plunger being of sufficiently reduced diameter relative to the diameter of said auxiliary reservoir to form a passage for ink communicating at all times between the lower end of the auxiliary reservoir and the main reservoir.

In testimony whereof I affix my signature in presence of two witnesses.

FRANK M. ASHLEY.

Witnesses:
HENRY BEST,
JULIAN S. WOOSTER.